United States Patent
Kim

(10) Patent No.: US 6,873,853 B2
(45) Date of Patent: Mar. 29, 2005

(54) METHOD AND APPARATUS FOR PROVIDING COMMERCIAL BROADCASTING SERVICE IN CELLULAR MOBILE COMMUNICATION NETWORK

(75) Inventor: Hoe-Won Kim, Namwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/278,290

(22) Filed: Oct. 23, 2002

(65) Prior Publication Data

US 2003/0078061 A1 Apr. 24, 2003

(30) Foreign Application Priority Data

Oct. 23, 2001 (KR) .................................... 2001-0065421

(51) Int. Cl.[7] ................................................ H04Q 7/20
(52) U.S. Cl. ...................... 455/466; 455/450; 455/410; 455/411; 455/3.1; 713/163; 713/168; 713/170; 380/255; 380/210; 380/239; 380/212; 709/217; 348/12
(58) Field of Search .......................... 455/466, 3.1, 410, 455/411; 209/217; 348/12; 380/247, 255, 210, 239, 212; 213/163, 168, 170

(56) References Cited

U.S. PATENT DOCUMENTS 6,052,715 A * 4/2000 Fukui et al. ................. 725/114
6,510,515 B1 * 1/2003 Raith .......................... 713/163

* cited by examiner

Primary Examiner—David Hudspeth
Assistant Examiner—David Q Nguyen
(74) Attorney, Agent, or Firm—Dilworth & Barrese LLP

(57) ABSTRACT

A method and an apparatus for providing only authorized mobile subscribers with a specified commercial broadcasting service in a cellular mobile communication network. A base station transmits a control signal including a common traffic ciphered key having a specified validation period through a dedicated secure signal channel assigned to a respective authorized subscriber terminal. The base station then enciphers broadcasting data from a broadcasting system with the common traffic ciphered key, for broadcasting through a common traffic broadcasting channel. The base station periodically updates the common traffic ciphered key according to the corresponding validation period. A subscriber terminal obtains the common traffic ciphered key from the control signal received through the dedicated secure signal channel, and deciphers the broadcasting signal with the obtained common traffic ciphered key to obtain therefrom the broadcasting data. The broadcasting data is displayed after a predetermined video signal processing.

18 Claims, 11 Drawing Sheets

METHOD AND APPARATUS FOR PROVIDING COMMERCIAL BROADCASTING SERVICE IN CELLULAR MOBILE COMMUNICATION NETWORK

PRIORITY

This application claims priority to an application entitled "Method And Apparatus For Providing Commercial Broadcasting Service In Cellular Mobile Communication Network" filed in the Korean Industrial Property Office on Oct. 23, 2001 and assigned Serial No. 2001-65421, the contents of which are hereby incorporated by reference.

BACKGROUND OF THE INVENTION

1. Field of the Invention

The present invention relates generally to a cellular mobile communication network in digital mobile communication systems, and in particular, to a method and apparatus for providing commercial broadcasting services in the cellular mobile communication network.

2. Description of the Related Art

The communication-related environment in both the conventional and future communication systems is and will be changing very rapidly in both fields of wireless and wired communication systems over international networks as well as in local networks. In general, mobile communication systems refer to different telecommunication systems providing personal wireless data transmission while the subscribers roam the system area. In addition to conventional speech transmission, the digital mobile communication systems provide a diversity of other services: short message services, broadcasting service, data transmission, etc. Of these, the data transmission service particularly provides a mobile subscriber with a chance of wireless Internet access to almost all data services of fixed networks. In particular, the third generation of mobile communication systems, e.g., the IMT-2000 (International Mobile Telecommunication-2000) system, should be implemented with more integrated communication environments most suited to provide the mobile subscriber with the diversity of information services, on a real time basis, as well as the speech and picture transmissions in the conventional meaning. Further, the recent and rapid developments in the technology of mobile communication systems, later cilia, mobile communication terminals or mobile phones, e.g., cellular phones, PCS (Personal Communication Service) phones, or IMT-2000 terminals, are trending toward providing mobile subscribers with a variety of information/data transmission services via wireless Internet access on their mobile terminals, as well as the conventional speech communications.

FIG. 1 shows a schematic diagram illustrating the structure of a wireless communication system in a conventional cellular communication network. Referring to the structure, a total serviceable area on the cellular communication network generally consists of a plurality of smaller service areas, i.e., cells 102a and 102b, in the center of which cells a base station 110a or 110b is respectively positioned to communicate various speech/data traffic and control signals with mobile stations 120 within each assigned cell via a wireless interface. FIG. 2 shows the structure of a wireless channel formed between a base station 110 and a mobile terminal 120, wherein a channel 1 established in the direction from the base station 110 toward the mobile terminal 120 is referred to as a downlink channel, while another channel 2 established in the direction from the mobile terminal 120 toward the base station 110 is referred to as an uplink channel.

In the meantime, digital television systems, that are designed in general to convert picture images into digital data for transmission to its receiver end on a real time basis and to receive the transmitted digital data for reproduction of the picture images on a digital television receiver, have been recently developed up to an intelligent apparatus capable of servicing various digital data information formats as well as the conventional transmission and reproduction of picture images and audio signals. In particular, the recent technical development in this field of the art, i.e., digital television systems, allows more effective compression of the moving picture images into compatible digital data for high speed and high quality data transmission on a real time basis together with more abundant contents of information, even on a commercial scale. Transmission and reception of these digital picture images of information could be provided with cable or satellite television systems as well as over-the-air broadcasting systems.

As a result, therefore, a variety of techniques have been devised in the art to utilize the respective advantages of the digital mobile communication system and the digital television system to the maximum degree, while making the most effective connection or combination between these two systems. The result of several researches carried out to date reveals that the transmission of digital moving picture images of information to mobile communication terminals in the future mobile communication systems will most probably be provided through a supplemental channel proposed for a packet data service. The supplemental channel is a kind of dedicated traffic channel for mutual communications between a specified base station and a mobile terminal only.

If a service provider should intend to provide its mobile subscribers with any television broadcasting service on a non-commercial basis, then every mobile terminal would be permitted to access the downlink traffic channel in the direction from the base station to the mobile terminals. On the other hand, if the service provider should intend to provide the mobile subscribers with any television broadcasting service on a commercial or profitable basis, it would then be required that only authorized mobile terminals are allowed to access such a specified television broadcasting service and unauthorized terminals would not be allowed access. The use of known broadcasting service techniques available in the conventional mobile communication systems, however, usually allows its broadcasting traffic channel to be accessed by every desired mobile terminal without specific limitation, thereby failing to prevent the unauthorized subscribers from appropriating the specified broadcasting traffic channel.

SUMMARY OF THE INVENTION

It is, therefore, an object of the present invention to provide a method and an apparatus for providing only authorized mobile subscribers with a specified commercial broadcasting service in a cellular mobile communication system network.

It is another object of the present invention to provide a method and an apparatus for providing only authorized mobile subscribers with a specified commercial broadcasting service through an encoded broadcasting traffic channel in a cellular mobile communication system network.

It is a further object of the present invention to provide a method and an apparatus for making a periodic updating of an encryption key in the broadcasting traffic channel for effecting the commercial broadcasting service utilizing the cellular mobile communication system network.

These and other objects can be achieved by a method for providing a commercial type of broadcasting service through a wireless channel in a base station of a cellular mobile communication system network, including the steps of transmitting a control signal with a common traffic ciphered key having a specified validation period, through a secure signal channel assigned exclusively to a respective authorized subscriber terminal for the broadcasting service; and enciphering a series of broadcasting data received from a broadcasting system, with the common traffic ciphered key, and then broadcasting the series of broadcasting data through a common traffic broadcasting channel.

Advantageously, the method further includes the step of making a periodic updating of the common traffic ciphered key according to said respective validation period.

Preferably, the validation period is variably defined according to the number of authorized subscriber terminals for the broadcasting service and a bandwidth of the secure signal channel.

Preferably, the control signal is enciphered with a private signal key assigned to the respective authorized subscriber terminal for a suitable signal processing in association with the base station.

More preferably, the secure signal channel for the common traffic broadcasting channel and all the authorized subscriber terminals is configured to be mapped in time division onto an identical physical channel. Generally, the secure signal channel is configured to be mapped onto a physical channel reserved for all the authorized subscriber terminals.

According to another aspect of the present invention, there is provided a method for receiving a commercial type of broadcasting service through a wireless channel in a mobile subscriber terminal of a cellular mobile communication system network, including the steps of deciphering a control signal received through a dedicated secure signal channel with a private signal key assigned to a respective mobile subscriber terminal to obtain therefrom a common traffic ciphered key having a specified validation period; deciphering a broadcasting signal received through a common traffic broadcasting channel with the common traffic ciphered key to generate therefrom a series of broadcasting data; and displaying the broadcasting data in accordance with a predetermined video signal processing.

According to further aspect of the present invention, there is provided an apparatus for providing a commercial type of broadcasting service to a mobile subscriber terminal through a wireless channel in a cellular mobile communication system network, said apparatus including a broadcasting system for formatting a set of video data provided from a video resource so as to be suited to the mobile communication network; at least one base station for transmitting a control signal including a common traffic ciphered key having a specified validation period through a dedicated secure signal channel assigned to a respective authorized subscriber terminal for the broadcasting service and then enciphering the formatted broadcasting data provided from the broadcasting system, with the common traffic ciphered key, for broadcasting through a common traffic broadcasting channel; and said at least one mobile subscriber terminal for obtaining the common traffic ciphered key from the control signal received through the dedicated secure signal channel, for deciphering the broadcasting signal received through the common traffic broadcasting channel with the obtained common traffic ciphered key to obtain therefrom the broadcasting data, and for displaying the broadcasting data after a predetermined video signal processing thereto.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
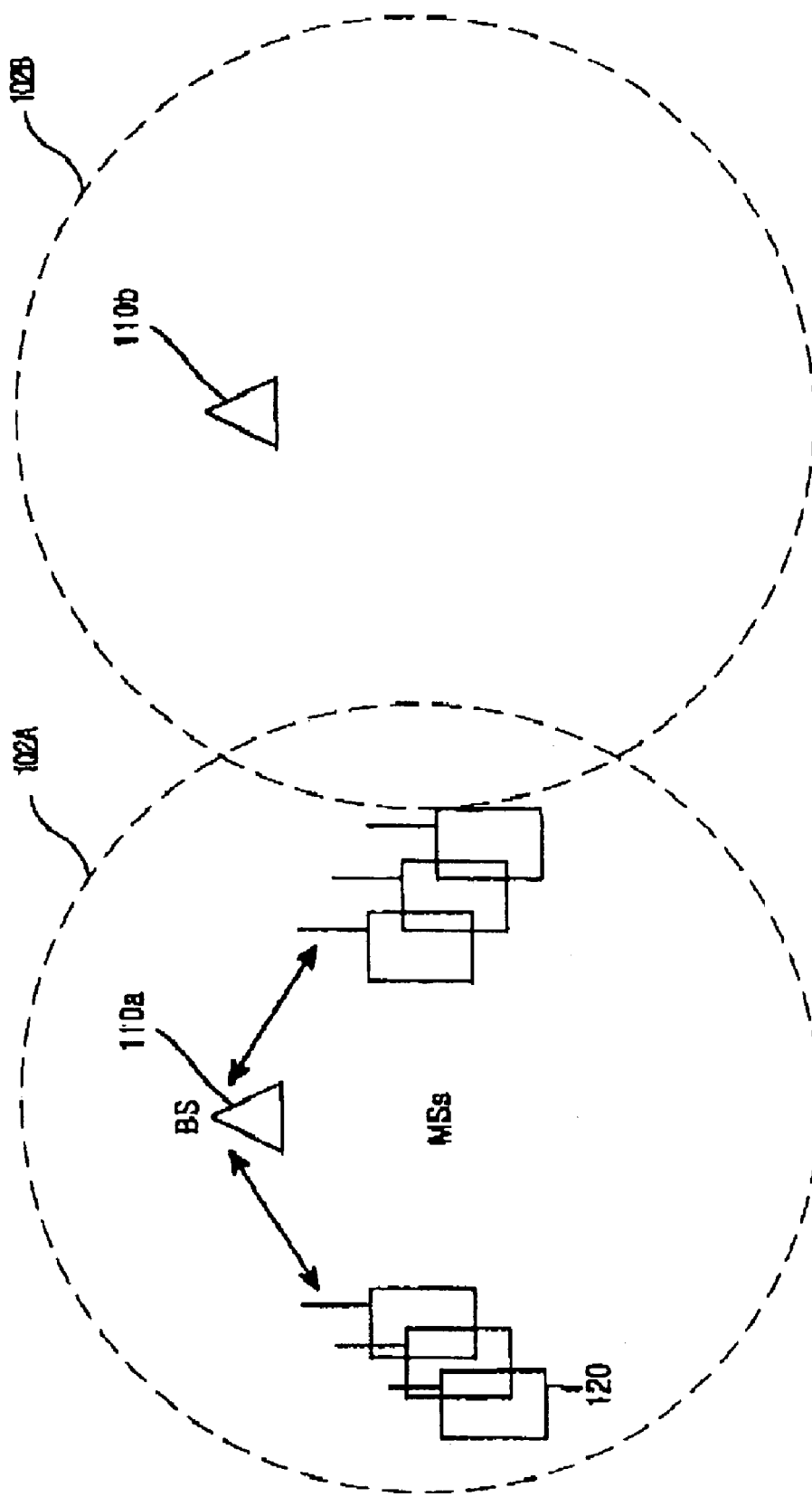
FIG. 1 is a schematic diagram illustrating the typical structure of a cellular mobile communication system network.
Figure 2:
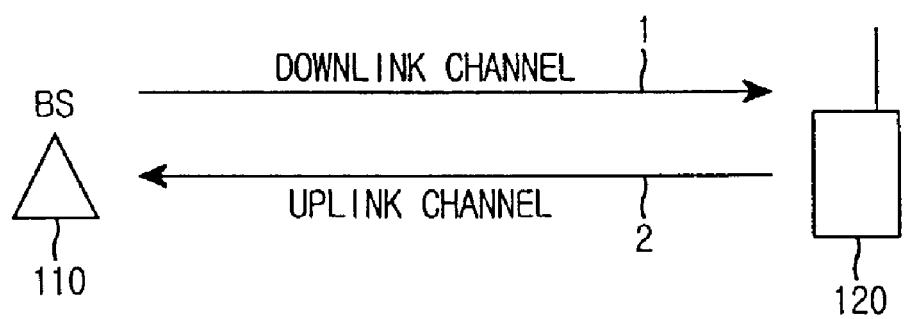
FIG. 2 is a schematic diagram illustrating the formation of a wireless channel between a base station and a mobile terminal in a cellular mobile communication system network.

Preferred embodiments of the present invention will be described herein below with reference to the accompanying drawings, wherein the same components or parts thereof will be represented with the same reference numerals or symbols to avoid any redundancy or repetition, if available. In the following description, well-known functions or constructions are not described in detail since they would obscure the invention in unnecessary detail. Further, any particular terms or wordings used throughout the following description of the present invention may be subject to some degree of modification or changes depending on the situation or intention of its users or operators. Thus, their definitions should be preferably made with reference to the contents disclosed throughout the description.

In the following description, the invention is characterized in that broadcasting traffic and control signals are encoded and transmitted with an encryption key available for any authorized subscribers only. Here, a uni-directional downlink channel carrying the broadcasting traffic is referred to as a CTBCH (Common Traffic Broadcasting Channel), and a bi-directional channel carrying the control signals is referred to as a SSCH (Secure Signaling Channel). The CTBCH channel serves to transmit the broadcasting traffic data to all the authorized mobile subscribers, and the SSCH channel is a dedicated channel for signaling to a specified authorized subscriber only, usable for the purposes, for example, of calling, channel connection, protocol agreement, information transfer, and/or channel release in a cellular mobile communication system.

Figure 3:
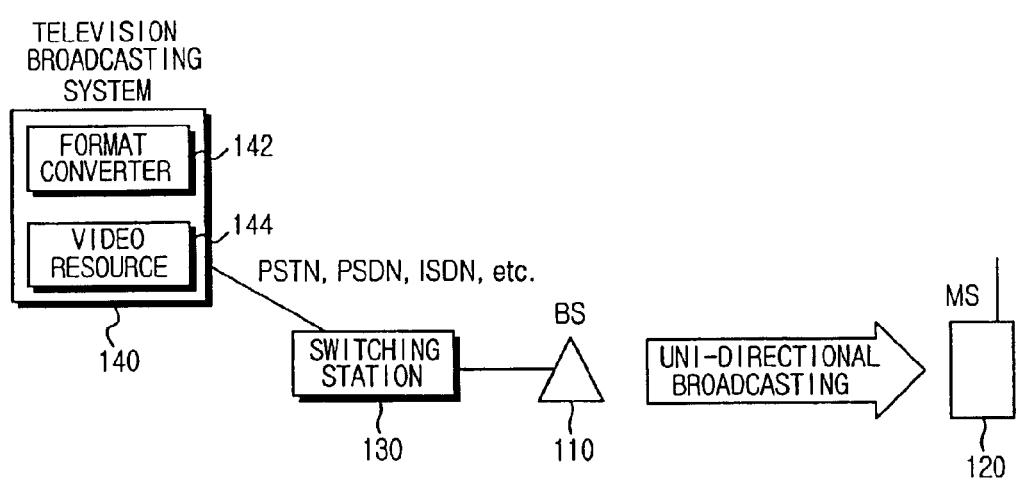
FIG. 3 is a schematic block diagram illustrating the structure of an entire system for providing a broadcasting service in a cellular mobile communication system network according to the present invention.

FIG. 3 schematically shows the structure of an entire system for providing a broadcasting service in a cellular mobile communication system network according to the present invention, in which a broadcasting service system is comprised of a television broadcasting system 140, a switching station 130, a base station 110 and at least one mobile subscriber terminal 120. The television broadcasting system 140 includes a video resource 144 for transmitting a data stream of video and audio signals to a television receiver set (not shown) via a satellite system, an over-the-air broadcasting network, or a cable network, and a format converter 142 for converting the data stream of video and audio signals to a specified video format, e.g., an MPEG-4 specification, more suited to a mobile communication system network. The video resource 144, including moving video images and any audio resource, may be a conventional analog television broadcasting system or a digital television broadcasting system, or any other moving video resource.

The analog television system includes NTSC (National Television Standards Committee), PAL (Phase Alternation Line) and SECAM (System Electronic Couleur Avec Memoire) systems, while the digital television system includes ATSC (Advanced Television System Committee) system for the United States of America, DVB (Digital Video Broadcasting) system for European countries, and a Japanese digital system. The ATSC system adopts MPEG-2 (for video compression), Dolby AC3 (for audio compression) and 8VSB (for transmission standard) systems, while the DVB system adopts MPEG-2 (for video compression) and OFDM (for transmission) systems. In the Republic of Korea, the ATSC system for a conventional over-the-air broadcasting system and the DVB system for a satellite broadcasting system are employed. As aforementioned, the video resource 144 provides the video and audio signals in the form of compressed digital data in bit streams according to its own predetermined transmission specification in association with transmitting and receiving of broadcasting signals. The digital broadcasting information formatted to comply with the specified transmission specification includes video and/or audio data, and various additional information such as EPG (Electronic Program Guide) data.

In case the video resource 144 corresponds to a digital television broadcasting system, its generated video image will be a video resource compression-encoded in compliance to MPEG-2 specification. Thus, the format converter 142 converts the video images from the video resource 144 to a specified video format suitable to a mobile communication system, for example, in MPEG-4 format. Alternatively, in case that the video resource 144 is an analog television broadcasting system, the format converter 142 converts the video images from the video resource 144 to digital data in the format most suitable to a mobile communication system. The format converter 142 may be incorporated into the television broadcasting system 140, as shown in FIG. 3, or into the switching station 130, or as a separate system alone.

The format converter 142 serves to convert MPEG-2 video images from the video resource 144 to either MPEG-2 format, H.263 format or H.26X format, according to the characteristic of an associated mobile communication network. The converted format is not limited to the above, but selected to be best suited to the above characteristic. The format converter 142 carries out transcoding of the above video and audio data streams and also formatting of the additional information including the EPG (Electronic Program Guide) data of various digital television information, for the purpose of effecting the conversion to the broadcasting signals complying to the specification suitable to the associated mobile communication network.

Figure 4:
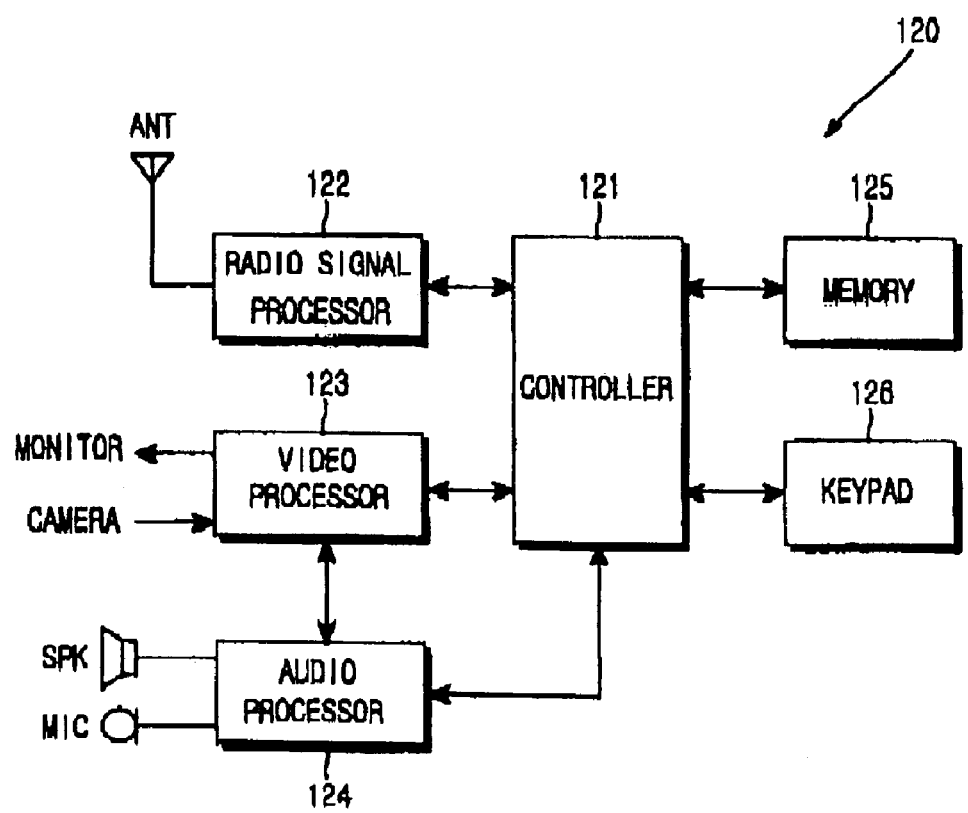
FIG. 4 is a schematic block diagram illustrating the stricture of a mobile terminal adapted to receive a specified broadcasting channel according to a preferred embodiment of the present invention.

The converted digital video and audio data and information are transferred to the switching station 130 via PSTN (Public Switched Telephone Network), PSDN (Public Switched Data Network) and/or ISDN (Integrated Switched Data Network) for a transmission to a mobile communication network. The switching station 130 transmits the above video and audio data and information to the subscriber terminal 120 via the base station 110. Here, the switching station 130 corresponds to a higher ranked system than the base station and may include a mobile switching center or a home location register. The base station 110 includes a base station controller and a base transceiver subsystem. In conclusion, the aforementioned structure of the television broadcasting service system using a mobile communication network makes it possible to provide the video and audio signals from the television broadcasting system 140, the signals being converted into the format most suitable to the mobile communication network, to the mobile terminal 120 via the switching station 130 and the base station 110. The mobile subscriber can watch a specified television broadcasting program on a display screen of his own mobile terminal such as a cellular telephone, a PCS phone or an IMT-2000 terminal Referring now to FIG. 4, a detailed description will be made of the structure of the mobile subscriber terminal 120 adapted to receive a specified broadcasting channel according to a preferred embodiment of the present invention. A controller 121 is configured to control almost all of the operations performed in the mobile terminal 120. A memory 125 coupled with the controller 121 is configured to include a program memory, a data memory, a non-volatile memory and a voice memory. The program memory stores therein an operating program for controlling the overall operation performed in the mobile terminal, preferably having a flash memory. The data memory serves to temporarily store various data generated during the operation of the mobile terminal, preferably having a random access memory (RAM). The non-volatile memory serves to store therein a set of telephone numbers and subscribers' names registered, for example, for the purpose of speed dialing, and/or various system parameters, preferably including an electrically erasable programmable read only memory (EEPROM). A keypad 126 coupled with the controller 121 produces a specified set of key signals for instructing the controller 121 to perform a desired operation in the mobile terminal and a series of key data signals for entering desired key data into the controller. A radio signal processor 122 performs a low-pass filtering of down conversion in frequency to a radio frequency signal carrying the television broadcasting channel data received from an antenna ANT, and also a digital demodulation of the filtered signal, so as to provide a set of video data corresponding to the specified television broadcasting channel, in which the set of video data is reproduced in the data format, for example, of MPEG-4, H.26L, H.262, or H.26X as described above.

A video processor 123 functions as a video decoder to decode the video data outputted from the radio signal processor, in such a way that a television video signal section of the video signal is displayed on a television monitor (not shown) with a specified signal processing, while an audio signal section is provided to an audio processor 124 including a speaker SPK and a microphone MIC. The audio processor 214 converts the audio signal to a corresponding analog signal to make audible sound through the speaker.

Figure 5:
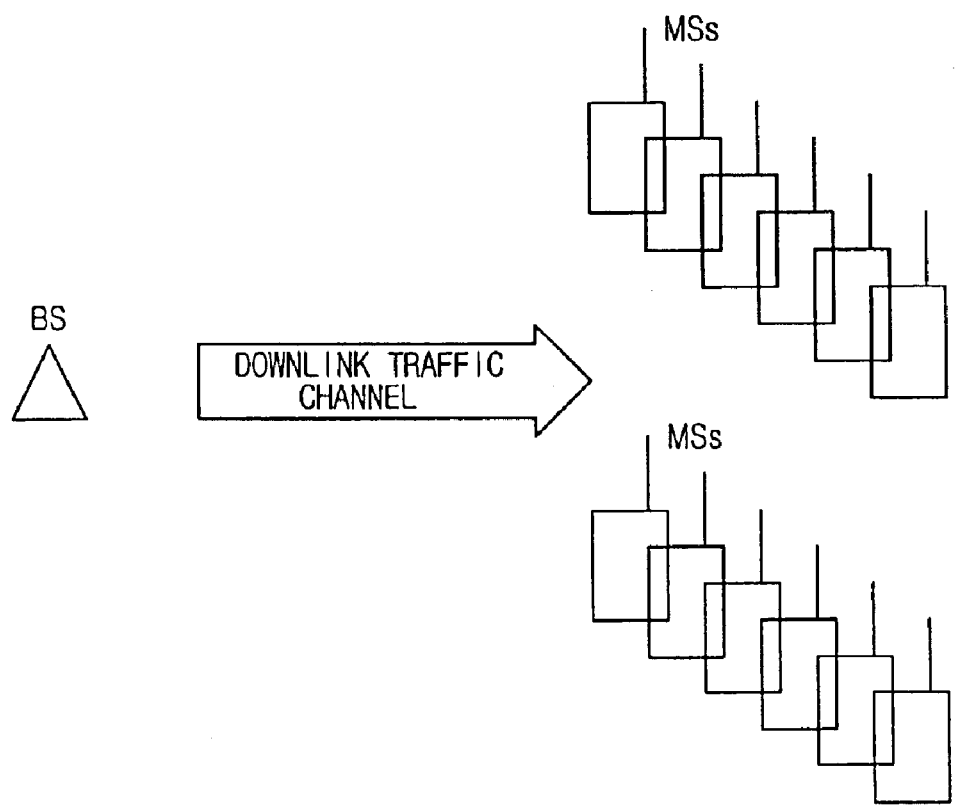
FIG. 5 is a schematic diagram illustrating the scheme of a non-commercial traffic broadcasting service provided for mobile terminals through a downlink traffic channel from a base station.
Figure 6:
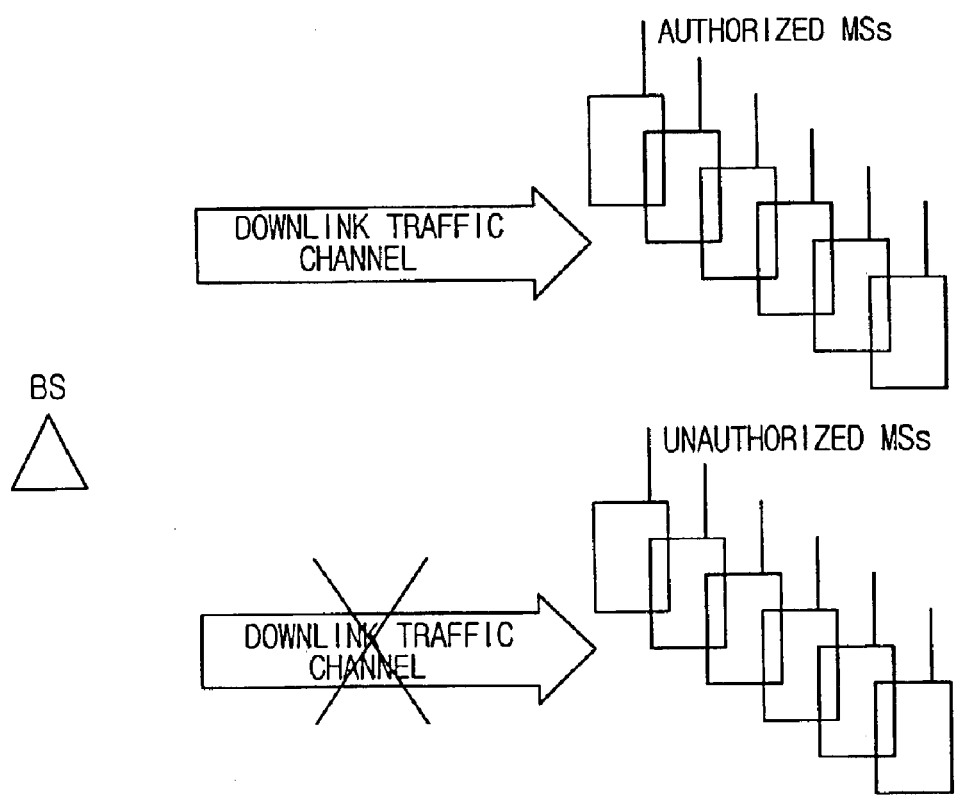
FIG. 6 is a schematic diagram illustrating the concept of a commercial traffic broadcasting service provided for a number of authorized mobile terminals through a secured downlink traffic channel from a base station according to the present invention.

As described above, it is appreciated that the television video data transferred to a mobile communication network system is broadcast using a broadcasting channel in a wireless mode. FIG. 5 illustrates the scheme of a non-commercial traffic broadcasting service provided for any mobile terminals through a downlink traffic channel from a base station BS, while FIG. 6 illustrates the concept of a commercial traffic broadcasting service provided for a number of authorized mobile terminals through a secured downlink traffic channel from a base station BS according to the present invention. Referring to FIG. 6, unauthorized mobile subscribers will not be served the broadcasting traffic since they would be unable to decode the secure downlink traffic channel.

The most important feature in this commercial broadcasting service is that it needs to control private unauthorized mobile subscribers to inhibit them from watching the associated broadcasting service at a specified timing point. Thus, it is noted that only the authorized mobile terminals should be provided with a suitable decryption key all the time. For this purpose, the present invention utilizes an encryption key having a specified validation period, in which the validation period means that the broadcasting traffic for the validation period has been encoded so as to enable decryption with a corresponding common traffic encryption key. Thus, the validation unit could be appreciated as a minimum unit for transmitting the traffic data block upon decryption.

Hereinafter, a more detailed description on the specific consideration taken in the base station and the mobile terminals will be made with reference to the accompanying drawings.

Figure 7:
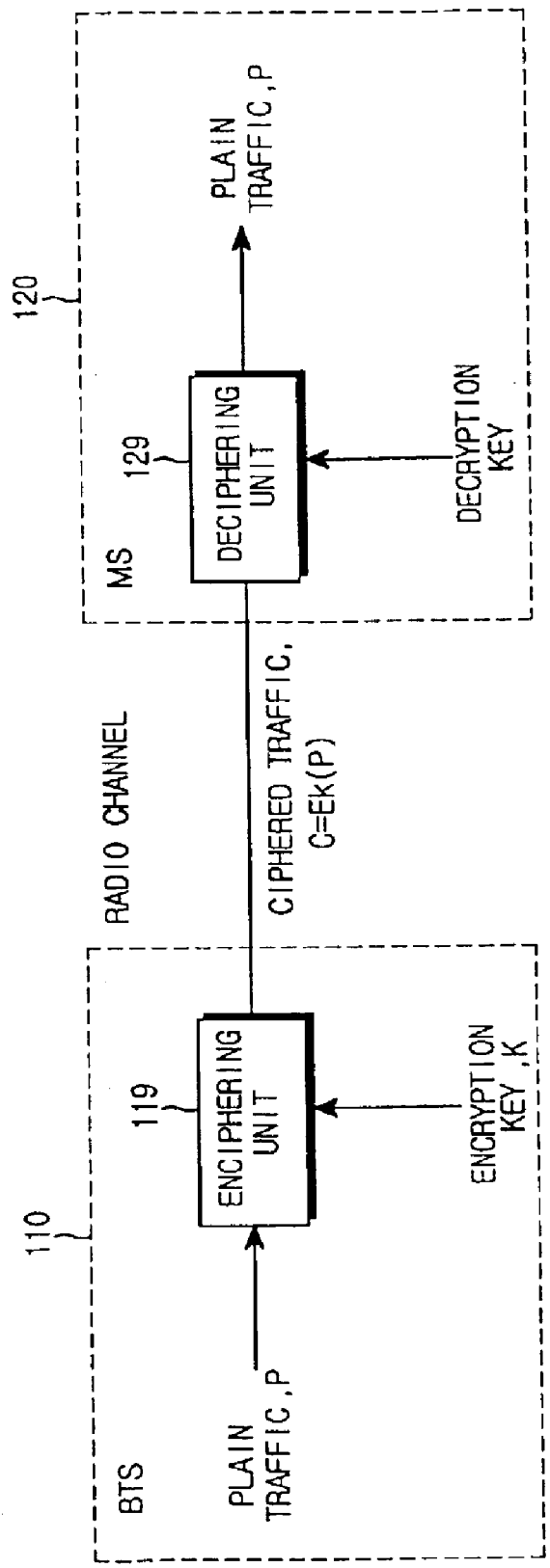
FIG. 7 is a schematic block diagram illustrating the encryption scheme applied between the base station and the mobile terminals according to the present invention.

FIG. 7 shows by way of example the encryption scheme applied between the base station and the mobile terminals according to the present invention. Referring to FIG. 7, the broadcasting traffic from the base station 110, i.e., non-encoded plain traffic P, is encoded with an encryption key k in an enciphering unit 119. Ciphered traffic C, which is enciphered from the plain traffic P with the encryption key k, will be expressed in the following formula: C=Ek(P). Then, a deciphering unit 129 of the mobile terminal 120 decodes the ciphered traffic C received through a wireless interface with a decryption key to extract therefrom the plain traffic P.

Figure 8:
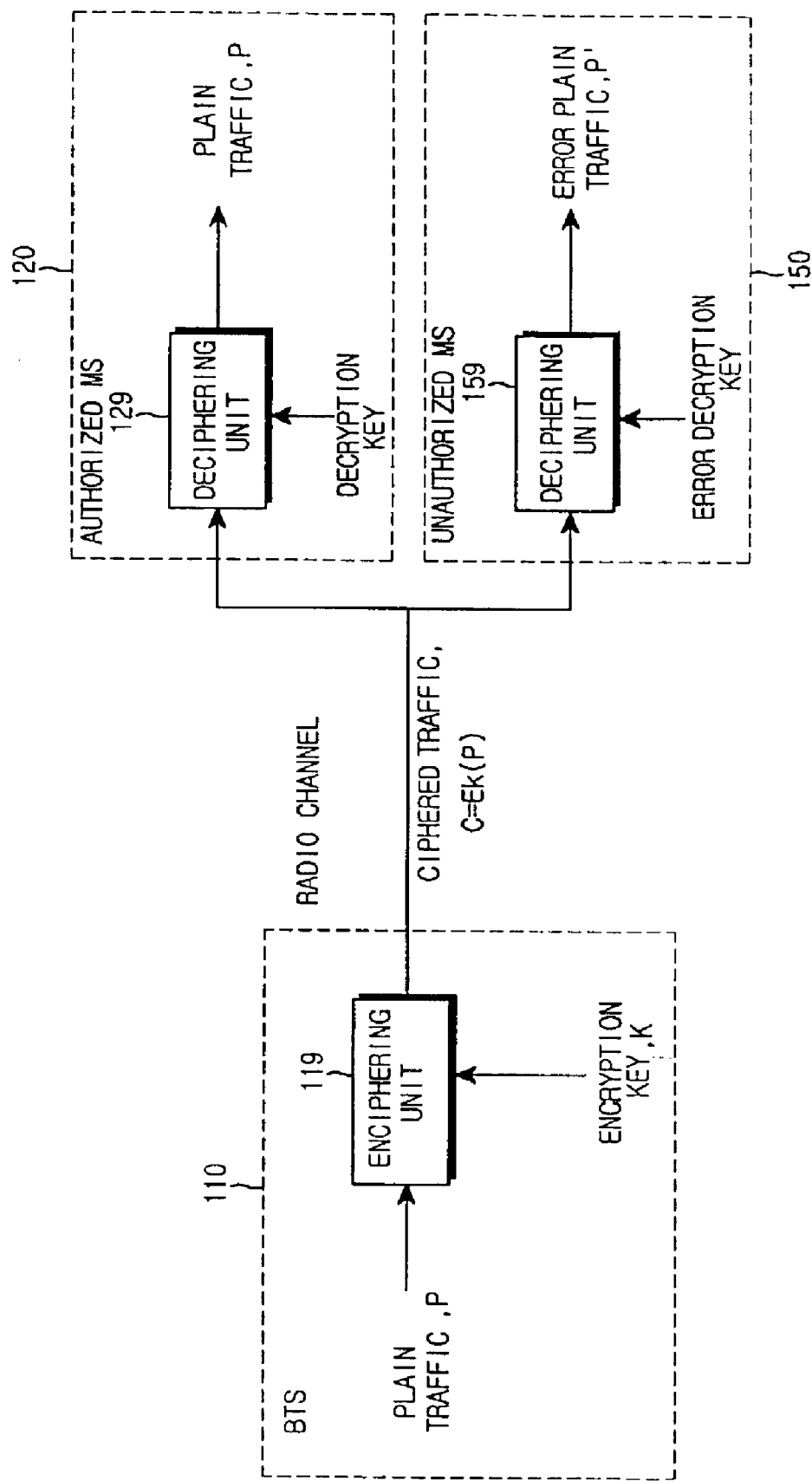
FIG. 8 is a schematic block diagram illustrating the encryption scheme for the commercial traffic broadcasting system according to a preferred embodiment of the present invention.

FIG. 8 schematically shows by way of example the encryption scheme for the commercial traffic broadcasting system according to a preferred embodiment of the present invention. Referring to FIG. 8, the broadcasting traffic from the base station 110, that is, the non-enciphered plain traffic P, is encoded with an encryption key k, notified to some authorized mobile terminals, in the enciphering unit 119. Then, the deciphering unit 129 of the mobile terminal 120 decodes the ciphered traffic C, which can be also expressed in the above formula (C=Ek(P)), received through the wireless interface with a correct decryption key to extract therefrom the plain traffic P. On the other hand, another deciphering unit 159 of an unauthorized mobile terminal 150 will not be able to normally extract the plain traffic P since it does not have such a correct decryption key therein.

As seen in the above description, the base station according to the present invention carries out an encryption to the broadcasting traffic for a television broadcasting service before its transmission and the mobile terminal then makes a decryption to the received broadcasting traffic for receiving the intended television broadcasting. Here, the encryption key and the decryption key are respectively determined according to a method of encryption used between the base station 110 and the mobile terminal 120. According to the present invention, the broadcasting traffic and the control signaling are respectively encoded using different keys. In other words, the common traffic key, referred to as "Kct" in the following description, is a key for enciphering or deciphering the broadcasting traffic transmitted through a common traffic broadcasting channel, while a private signal key, referred to as "Ksn" hereinafter, is a key for enciphering or deciphering the control signals transmitted through a security signal channel between the base station and a specified mobile subscriber terminal, wherein a reference character 'n' designates a subscriber index. That is to say, the key "Ksn" is assigned to a respective authorized subscriber terminal.

The encryption key (common traffic key) used in encryption and decryption of the broadcasting traffic is configured to be periodically updated according to a corresponding validation period (VP), which updated information is provided to only the authorized subscriber terminals. That is to say, the subscriber terminal completes the authorization by receiving the common traffic key Kct of a certain validation period (VP). At this time, the subscriber terminal receives a number of a next VP, its starting time (or its corresponding unit information), its ending time (or its corresponding unit information), and a corresponding common traffic encryption key, through a secure signaling channel (SSCH). Here, the traffic effected during the corresponding validation period is to be charged irrespectively of whether the subscriber terminal has actually received the broadcasting traffic or not.

Figure 9:
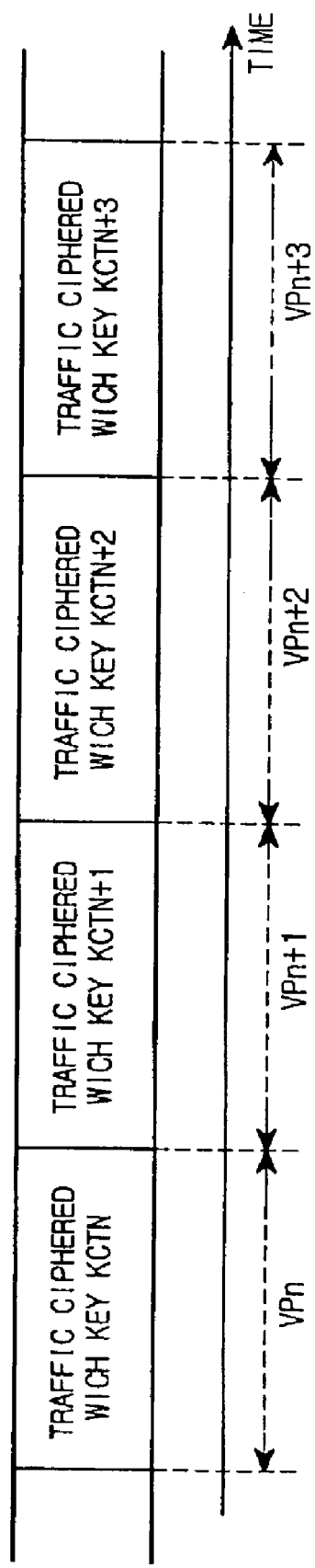
FIG. 9 is a schematic diagram illustrating the encryption scheme of the broadcasting traffic transmission encoded with a different key for every period according to the present invention.

FIG. 9 schematically shows the structure of the broadcasting traffic transmission encoded with a different key for every period according to the present invention. Referring to the illustrated structure, the traffic ciphered with a key Kctn in a validation period VP of a common traffic key Kct has a corresponding validation period VPn. Since all the traffic data broadcast in the VPn period are ciphered with Kctn, all the subscriber terminals authorized to access the traffic in the VPn period need to know the common traffic key Kctn before starting of VPn beforehand. The next common traffic key Kctn for a coming validation period VPn is transmitted to the authorized subscriber terminals in advance through the SSCH channel.

Figure 10:
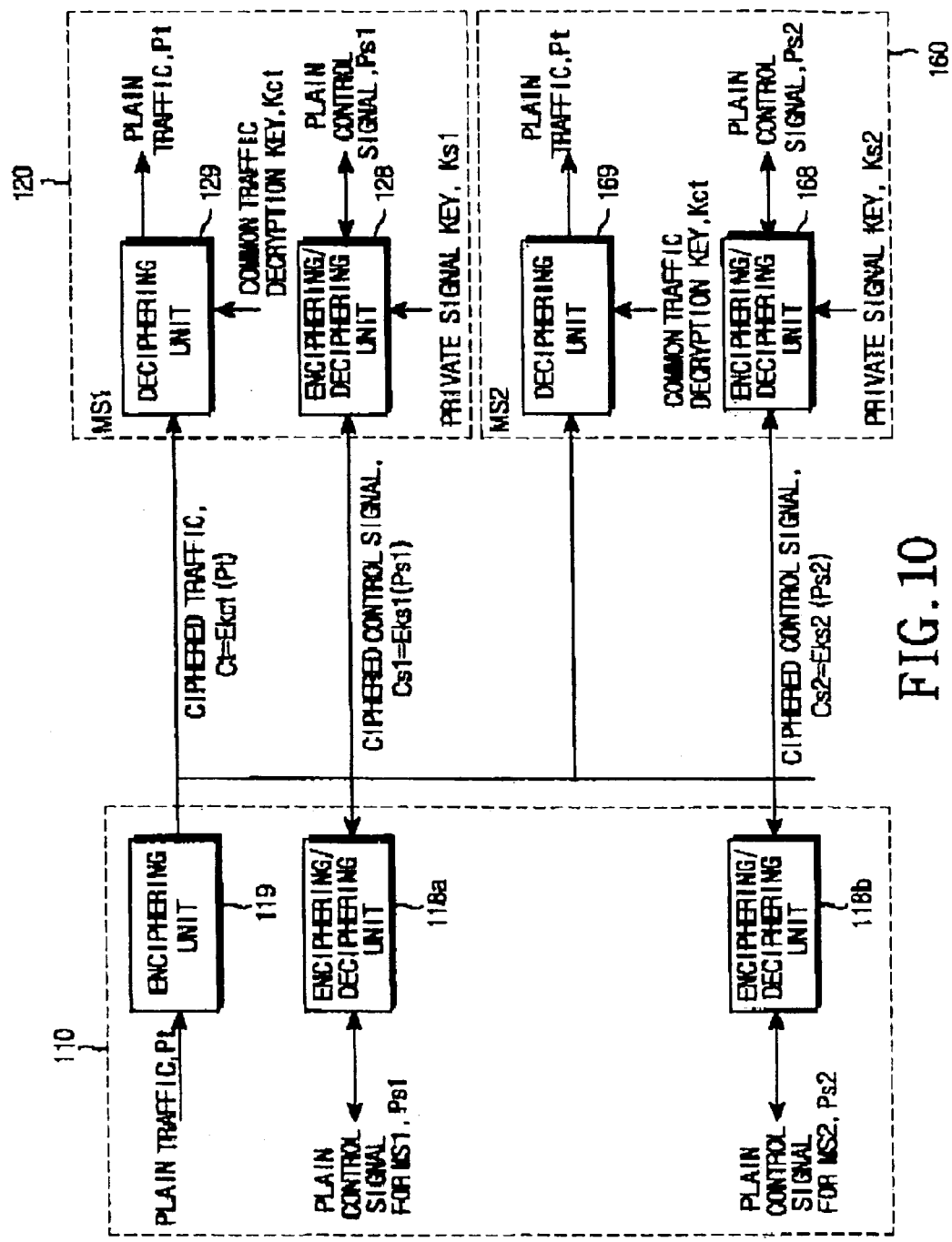
FIG. 10 is a schematic block diagram illustrating the encryption scheme for establishing a common traffic broadcasting channel and a secure signal channel according to a preferred embodiment of the present invention.

FIG. 10 schematically shows by way of example the encryption scheme for establishing the common traffic broadcasting channel and the secure signaling channel according to a preferred embodiment of the present invention. Referring to FIG. 10, the plain traffic Pt is ciphered with a ciphered key Kct known to only the authorized terminals in an enciphering unit 119 of the base station 110. Further, a plain control signal Psn for a specified mobile terminal (or mobile station) MSn is ciphered with a ciphered key Ksn known to a corresponding mobile terminal only in enciphering unit/deciphering unit 118a and 118b. The ciphered traffic defined by formula (Ct=Ekct (P)) and the ciphered control signal defined by formula (Csn=Eksn (Psn)), which were generated in the above encryption process, are respectively transmitted through a wireless channel.

Respective deciphering units 129 and 169 of the authorized mobile terminals 120 and 160 deciphers the ciphered traffic according to the formula (Ct=Ekct (P)), received through the wireless interface, using the correct deciphered key Kct so as to extract therefrom the plain traffic Pt. Likewise, respective enciphering/deciphering units 128 and 168 for the control signals of the authorized mobile terminals 120 and 160 deciphers the ciphered control signals according to the formula (Csn=Eksn (Psn)), received through the wireless interface, using the correct deciphered key Ksn so as to extract therefrom the plain control signals Psn. Here, the symbol 'n' designates an index for a given 'n'-th authorized subscriber. The deciphered plain traffic Pt corresponds to the broadcasting traffic, which is displayed on a monitor after being subjected to a specified video image processing in the mobile terminals 120 and 160.

In the meantime, the mobile terminals 120 and 160 encipher the control signal with a private signal key Ksn to generate therefrom the ciphered control signal according to the formula (Csn=Eksn (Psn)), and then transmit the ciphered control signal to the base station 110. Subsequently, the base station 110 receives this ciphered control signal to decipher the same with the private signal key Ksn and then extracts therefrom the plain control signal.

Now, the updating procedure of the common traffic ciphered key Kct according to the present invention will be described in detail. The Kct updating procedure is used to have any authorized subscriber terminal notified of a common traffic ciphered key Kct of a next VP prior to starting of the next VP. All of the Kct updating procedure for a respective authorized subscriber terminal should be completed at the latest before the starting of the next VP. Some of the authorized subscribers within the current VP may be defined as non-authorized subscribers for the next VP. Therefore, the content of this Kct updating procedure should be protected from not only those non-authorized subscribers but also the other authorized subscribers within the current VP.

As aforementioned, the Kct updating procedure is implemented through a bi-directional SSCH channel. The bandwidth of a physical channel reserved for those SSCH channels in the current VP should be wide enough to allow assignment of the SSCH channels for the respective authorized subscribers in the next VP. The length of VP concerns the bandwidth of all the SSCH channels and the number of maximum mobile subscribers on use. Thus, according to the system condition, for example, in particular, when a mapping of the SSCH channels is made to a part of the physical channel identical to the common traffic broadcasting channel, the length of VP may change dynamically. The common traffic broadcasting channel for each authorized subscriber and all the SSCH channels can be mapped in time division to a single physical channel, e.g., by means of TDMA (Time Division Multiple Access), or a single physical channel may be in total reserved for the SSCH channels.

Figure 11:
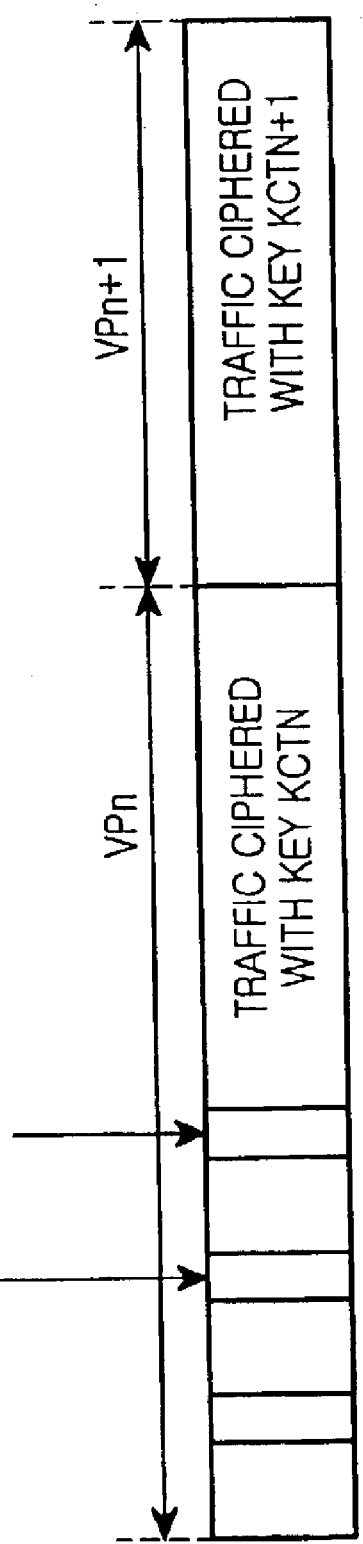
FIG. 11 is a schematic diagram illustrating the structure of the common traffic broadcasting channel and the secure signal channel according to a preferred embodiment of the present invention.

Referring now to FIG. 11, it is illustrated by way of example a part of the format structure of the common traffic broadcasting channel and the secure signal channel SSCH according to a preferred embodiment of the present invention. The SSCH channels for the mobile subscriber terminals within a single validation period VP is mapped in time division to a part of the physical channel identical to the common traffic broadcasting channel, in which the physical channel provides a bandwidth that is wide enough to transmit the broadcasting channel.

As apparent from the foregoing description, the present invention provides numerous advantages and effects as follows. The invention allows a subscriber to watch on a television broadcasting of moving picture images through a wireless mobile communication network. Further, it can efficiently prevent any unauthorized subscriber terminals from viewing the specified television broadcasting service, thereby allowing to provide only the authorized subscribers with a specified commercial broadcasting service with charging to those subscribers. Furthermore, the present invention makes a periodic updating of the traffic ciphered key for enciphering the associated broadcasting traffic, so that any unauthorized users who may have come to know the current ciphered key by any improper manner will be unable to view the corresponding broadcasting service after an elapse of a specified validation period.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing a commercial type of broadcasting service through a wireless channel in a base station of a cellular mobile communication system network, comprising the steps of:

transmitting a control signal with a common traffic ciphered key having a specified validation period, through a secure signal channel assigned exclusively to a respective authorized subscriber terminal for the broadcasting service; and enciphering a series of broadcasting data received from a broadcasting system, with the common traffic ciphered key, and then broadcasting the series of broadcasting data through a common traffic broadcasting channel, wherein said validation period is variably defined according to a number of the authorized subscriber terminal for the broadcasting service and a bandwidth of the secure signal channel.

2. The method according to claim 1, further comprising the step of periodically updating the common traffic ciphered key according to said specified validation period.

3. The method according to claim 1, wherein the control signal is enciphered with a private signal key assigned to the respective authorized subscriber terminal for signal processing in association with the base station.

4. The method according to claim 2, wherein the control signal is enciphered with a private signal key assigned to the respective authorized subscriber terminal for signal processing in association with the base station.

5. The method according to claim 1, wherein the secure signal channel for the common traffic broadcasting channel and all the authorized subscriber terminals is configured to be mapped in time division onto an identical physical channel.

6. The method according to claim 2, wherein the secure signal channel for the common traffic broadcasting channel and all the authorized subscriber terminals is configured to be mapped in time division onto an identical physical channel.

7. The method according to claim 1, wherein the secure signal channel is configured to be mapped onto a physical channel reserved for all the authorized subscriber terminals.

8. The method according to claim 2, wherein the secure signal channel is configured to be mapped onto a physical channel reserved for all the authorized subscriber terminals.

9. A method for receiving a commercial type of broadcasting service through a wireless channel in a mobile subscriber terminal of a cellular mobile communication system network, comprising the steps of:

deciphering a control signal received through a dedicated secure signal channel with a private signal key assigned to a respective mobile subscriber terminal to obtain therefrom a common traffic ciphered key having a specified validation period;

deciphering a broadcasting signal received through a common traffic broadcasting channel with the common traffic ciphered key to generate therefrom a series of broadcasting data; and displaying the broadcasting data in accordance with a predetermined video signal processing, wherein said validation period is variably defined according to a number of the authorized subscriber terminal for the broadcasting service and a bandwidth of the secure signal channel.

10. The method according to claim 9, further comprising the step of enciphering the control signal with the private signal key and then transmitting the ciphered control signal through the secure signal channel.

11. An apparatus for providing a commercial type of broadcasting service to a mobile subscriber terminal through a wireless channel in a cellular mobile communication system network, comprising:

a broadcasting system for formatting a set of video data provided from a video resource so as to be suited to the mobile communication network;

at least one base station for transmitting a control signal including a common traffic ciphered key having a specified validation period through a dedicated secure signal channel assigned to a respective authorized subscriber terminal for the broadcasting service and then enciphering the formatted broadcasting data provided from the broadcasting system, with the common traffic ciphered key, for broadcasting through a common traffic broadcasting channel; and at least one mobile subscriber terminal for obtaining the common traffic ciphered key from the control signal received through the dedicated secure signal channel, for deciphering the broadcasting signal received through the common traffic broadcasting channel with the obtained common traffic ciphered key to obtain therefrom the broadcasting data, and for displaying the broadcasting data after a predetermined video signal processing thereto, wherein the validation period is variably defined depending upon a number of the authorized subscriber terminals and a bandwidth of the secure signal channel.

12. The apparatus according to claim 11, wherein the base station is configured to periodically update the common traffic ciphered key according to the specified validation period.

13. The apparatus according to claim 11, wherein the control signal is enciphered with a private signal key assigned to the respective authorized subscriber terminal for signal processing in association with the base station.

14. The apparatus according to claim 12, wherein the control signal is enciphered with a private signal key assigned to the respective authorized subscriber terminal for signal processing in association with the base station.

15. The apparatus according to claim 11, wherein the secure signal channel for the common traffic broadcasting channel and all the authorized subscriber terminals is configured to be mapped in time division onto an identical physical channel.

16. The apparatus according to claim 12, wherein the secure signal channel for the common traffic broadcasting channel and all the authorized subscriber terminals is configured to be mapped in time division onto an identical physical channel.

17. The apparatus according to claim 11, wherein the secure signal channel is configured to be mapped onto a physical channel reserved for all the authorized subscriber terminals.

18. The apparatus according to claim 12, wherein the secure signal channel is configured to be mapped onto a physical channel reserved for all the authorized subscriber terminals.

* * * * *